(12) United States Patent
Wang et al.

(10) Patent No.: US 10,807,896 B2
(45) Date of Patent: Oct. 20, 2020

(54) PROCESS AND APPARATUS FOR GLASS MANUFACTURE

(71) Applicant: Owens-Brockway Glass Container Inc., Perrysburg, OH (US)

(72) Inventors: Zhongming Wang, Ypsilanti, MI (US); Carl L. Fayerweather, Maumee, OH (US); Kevin X Yu, Perrysburg, OH (US); Shivakumar S Kadur, Perrysburg, OH (US); Dinesh Gera, Sylvania, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 173 days.

(21) Appl. No.: 15/922,549

(22) Filed: Mar. 15, 2018

(65) Prior Publication Data

US 2019/0284079 A1 Sep. 19, 2019

(51) Int. Cl.
| | | |
|---|---|---|
| *C03B 5/225* | (2006.01) | |
| *C03B 5/235* | (2006.01) | |
| *C03B 5/193* | (2006.01) | |
| *C03B 5/26* | (2006.01) | |
| *C03B 5/44* | (2006.01) | |
| *C03B 3/02* | (2006.01) | |
| *C03B 5/23* | (2006.01) | |
| *C03C 1/00* | (2006.01) | |

(52) U.S. Cl.
CPC ............ *C03B 5/2252* (2013.01); *C03B 3/02* (2013.01); *C03B 5/193* (2013.01); *C03B 5/225* (2013.01); *C03B 5/2356* (2013.01); *C03B 5/262* (2013.01); *C03B 5/44* (2013.01); *C03C 1/004* (2013.01); *C03B 5/23* (2013.01); *C03B 2211/22* (2013.01); *C03B 2211/23* (2013.01)

(58) Field of Classification Search
CPC .................................................. C03B 5/225
See application file for complete search history.

(56) References Cited

U.S. PATENT DOCUMENTS 3,248,205 A 4/1966 Dolf et al.
3,606,825 A 9/1971 Johnson
(Continued)

FOREIGN PATENT DOCUMENTS

EP 3162771 A1 3/2017
GB 2244137 A 11/1991

OTHER PUBLICATIONS

PCT International Search Report and Written Opinion, Int. Serial No. PCT/US2019/018198, Int. Filing Date: Feb. 15, 2019, Applicant: Owens-Brockway Glass Container Inc., dated May 20, 2019.

*Primary Examiner* — Lisa L Herring

(57) ABSTRACT

A process and apparatus for manufacturing glass. A mixture of solid glass-forming materials comprising at least one fining agent are introduced into a doghouse located upstream of an elongated tank. The glass-forming materials are melted in the doghouse at a temperature at or above a fining-onset temperature of the at least one fining agent by application of heat from one or more submerged combustion burners. The resulting molten glass is relatively foamy and may comprise greater than 25 vol. % gas bubbles. The molten glass is directed from the doghouse into an upstream end of the tank where it is refined to produce molten glass having on average less than 20 seeds per ounce.

19 Claims, 2 Drawing Sheets

(56) References Cited

U.S. PATENT DOCUMENTS

| | | | |
|---|---|---|---|
| 3,891,422 A | | 6/1975 | Froberg et al. |
| 4,052,186 A | | 10/1977 | Rhodes |
| 4,110,097 A | | 8/1978 | Chevallier et al. |
| 4,290,797 A | | 9/1981 | Rossi |
| 4,539,034 A | | 9/1985 | Hanneken |
| 4,545,800 A | | 10/1985 | Won et al. |
| 4,607,016 A | * | 8/1986 | Danielson ............... C03C 3/087 501/68 |
| 4,659,356 A | | 4/1987 | Lawhon et al. |
| 5,766,296 A | | 6/1998 | Moreau |
| 5,922,097 A | * | 7/1999 | Kobayashi ............ C03B 5/2356 65/134.1 |
| 6,460,376 B1 | | 10/2002 | Jeanvoine et al. |
| 6,532,768 B1 | | 3/2003 | Labrot et al. |
| 6,532,771 B1 | | 3/2003 | Kobayashi et al. |
| 6,576,807 B1 | | 6/2003 | Brunelot et al. |
| 6,722,161 B2 | | 4/2004 | LeBlanc |
| 6,815,572 B1 | | 11/2004 | Brunelot et al. |
| 7,296,441 B2 | | 11/2007 | Leister et al. |
| 7,565,819 B2 | | 7/2009 | Jeanvoine et al. |
| 8,196,432 B2 | | 6/2012 | Jacques et al. |
| 8,561,430 B2 | | 10/2013 | Palmieri et al. |
| 8,650,914 B2 | | 2/2014 | Charbonneau |
| 2002/0162358 A1 | | 11/2002 | Jeanvoine et al. |
| 2004/0168475 A1 | | 9/2004 | Jeanvoine |
| 2006/0242996 A1 | * | 11/2006 | DeAngelis ............ C03B 5/1677 65/134.1 |
| 2009/0176639 A1 | | 7/2009 | Jacques et al. |
| 2009/0215607 A1 | * | 8/2009 | Dejneka .................. C03C 1/004 501/27 |
| 2010/0126225 A1 | | 5/2010 | Ding et al. |
| 2012/0210751 A1 | * | 8/2012 | Rue .................... B01D 19/0042 65/134.9 |
| 2013/0086950 A1 | | 4/2013 | Huber et al. |
| 2013/0086951 A1 | | 4/2013 | Charbonneau et al. |
| 2013/0086952 A1 | | 4/2013 | Charbonneau et al. |
| 2013/0239618 A1 | | 9/2013 | Ishikawa et al. |
| 2013/0283861 A1 | | 10/2013 | Mobley et al. |
| 2013/0327092 A1 | | 12/2013 | Charbonneau |
| 2013/0327096 A1 | | 12/2013 | Huber et al. |
| 2014/0007622 A1 | | 1/2014 | Shock et al. |
| 2014/0007623 A1 | | 1/2014 | Charbonneau et al. |
| 2014/0090423 A1 | * | 4/2014 | Charbonneau ........ C03B 5/2356 65/134.5 |
| 2015/0307382 A1 | * | 10/2015 | Wang ...................... C03B 3/023 65/335 |
| 2016/0122221 A1 | * | 5/2016 | Huber .................... C03B 5/225 65/128 |
| 2016/0207817 A1 | * | 7/2016 | Hojaji .................... C03C 11/002 |
| 2017/0217812 A1 | * | 8/2017 | De Angelis ............ C03B 5/225 |

\* cited by examiner

PROCESS AND APPARATUS FOR GLASS MANUFACTURE

The present disclosure is directed to melting of glass batch materials and, more particularly, to a method for melting glass batch materials using one or more submerged combustion burners.

BACKGROUND

Silica-based glass, such as soda-lime-silica glass, is prevalent in the commercial manufacture of glass containers and other articles. Molten glass used to make such articles is conventionally prepared by melting and reacting a batch of solid glass-forming materials in a refractory lined elongated tank of a continuously operated glass furnace. The glass-forming materials are typically introduced into a melting chamber at an upstream end of the tank of the furnace by being deposited onto a pool of molten glass already in the melting chamber in the form of a so-called "blanket" and are gradually melted into the pool by the continuous application of heat from one or more overhead burners. The resulting molten glass initially contains an undesirable amount of gas bubbles commonly referred to as seeds or blisters, which need to be removed. The process of eliminating gas bubbles from molten glass is called refining or fining, and is typically accomplished in a refining chamber downstream of the melting chamber by heating the molten glass to reduce its viscosity and maintaining the molten glass at such temperature for a sufficient time for the gas bubbles in the molten glass to rise to a free surface thereof and escape. Refining of the molten glass is typically performed at temperatures in the range of 1500 degrees Celsius to 1600 degrees Celsius.

Submerged combustion is an alternative melting process wherein a mixture of fuel and an oxidant is fired into the pool of molten glass from below a free surface thereof. Heat is effectively transferred to the material being melted by the products of combustion, which travel up through the molten glass and, at the same time, violently mix the glass-forming materials with the molten glass. The shearing action between the solid glass-forming materials and the molten glass increases the dissolution rate of the solid materials and allows the melting process to take place at a relatively low temperature, e.g., about 1200 degrees Celsius. When glass is manufactured using a submerged combustion process, the resulting molten glass typically contains a relatively large number of gas bubbles. Molten glass melted by application of heat from one or more overhead or submerged combustion burners will initially contain some amount of gas bubbles (typically carbon dioxide ($CO_2$) gas bubbles) due to decomposition of the various glass-forming materials. However, when submerged combustion is used to melt the glass-forming materials, additional gas bubbles may be introduced into the molten glass along with the by-products of combustion of the fuel and oxidant mixture and also may be formed as a result of the turbulent action within the molten glass caused by the submerged combustion processes. The presence of a relatively large number of gas bubbles within the molten glass requires additional time to effectively refine the molten glass, which limits the practical use of submerged combustion in the commercial production of glass articles.

BRIEF SUMMARY OF THE DISCLOSURE

A general object of the present disclosure, in accordance with one aspect of the disclosure, is to provide a process for manufacturing glass wherein a mixture of solid glass-forming materials is melted relatively quickly (as compared to conventional melting processes in which a blanket of solid glass-forming materials is melted into an underlying pool of molten glass via one or more overhead burners) and partially refined within a doghouse by application of heat from one or more submerged combustion burners. The use of submerged combustion burners allows the mixture of solid glass-forming materials to be melted in the doghouse at a relatively high temperature, as compared to conventional melting processes, and at sufficiently high temperatures to partially refine the molten glass. In addition, when submerged combustion burners are used to melt a mixture of solid glass-forming materials in the doghouse, the temperature of the resulting partially refined molten glass delivered to the furnace tank will typically be higher than the temperature of molten glass entering the refining chamber of a conventional commercial glass furnace. As disclosed herein, after the relatively high temperature, partially refined molten glass exits the doghouse, it is delivered to a tank of a conventional glass furnace where additional refining of the molten glass takes place. Due to the relatively high temperature of the molten glass entering the tank, and because the molten glass is already at least partially refined upstream of the tank, the presently disclosed submerged combustion melting process allows the overall glass melting and refining process to be completed in less time using less total energy than conventional commercial glass manufacturing operations.

The present disclosure embodies a number of aspects that can be implemented separately from or in combination with each other.

A process for manufacturing glass in accordance with one aspect of the disclosure includes: (a) providing a mixture of solid glass-forming materials, (b) introducing the mixture of solid glass-forming materials into a doghouse portion of a furnace located upstream of an elongated tank, (c) melting the mixture of solid glass-forming raw materials in the doghouse by application of heat from one or more submerged combustion burners, (d) producing a foamy molten glass comprising greater than 25 vol. % gas bubbles, (e) directing the foamy molten glass from the doghouse into an upstream end of the tank, and (f) refining the foamy molten glass in the tank to produce refined molten glass having on average less than 20 seeds per ounce. The mixture of solid glass-forming materials comprises at least one fining agent and is melted in the doghouse at a temperature at or above a fining-onset temperature of the at least one fining agent. The mixture of solid glass-forming materials may be melted in the doghouse at a temperature greater than or equal to 1350° C., for example, at a temperature in the range of 1350° C. to 1550° C. The foamy molten glass exiting the doghouse may be at a temperature in the range of 1450° C. to 1550° C.

In accordance with another aspect of the disclosure, there is provided a process for manufacturing glass. The process includes: (a) charging a mixture of solid glass-forming materials into a doghouse portion of a furnace located upstream of an elongated tank, (b) melting the mixture of solid glass-forming materials in the doghouse to produce molten glass, (c) directing the molten glass from the doghouse into an upstream end of the tank, (d) further melting and refining the molten glass in the tank, and then (e) discharging the molten glass from the tank. The mixture of solid glass-forming materials comprises less than 20 wt. % of at least one fining agent and is melted in step (b) at a temperature in the range of 1350° C. to 1550° C. by application of heat from one or more floor-mounted submerged combustion burners. The melting step (b) may be performed in less than 3 hours. The molten glass may be melted and refined in step (d) at temperatures at least 100 degrees Celsius lower than the initial melting temperatures in the doghouse for less than 6 hours. The total duration from the charging step (a) to the discharging step (e) may be less than 9 hours.

In accordance with yet another aspect of the disclosure there is provided an apparatus for manufacturing glass. The apparatus includes: a doghouse portion of a furnace and an elongated tank downstream of the doghouse. The doghouse receives and melts solid glass-forming materials by application of heat from one or more submerged combustion burners. The tank includes: a melting chamber having an inlet through which molten glass is received from the doghouse, a refining chamber downstream of the melting chamber that receives molten glass from the melting chamber, and a thermal conditioning chamber downstream of the refining chamber that receives molten glass from the refining chamber and delivers the molten glass to a glass forming machine.

BRIEF DESCRIPTION OF THE DRAWINGS

The disclosure, together with additional objects, features, advantages and aspects thereof, will be best understood from the following description, the appended claims and the accompanying drawing(s), in which:

DETAILED DESCRIPTION

Figure 1:
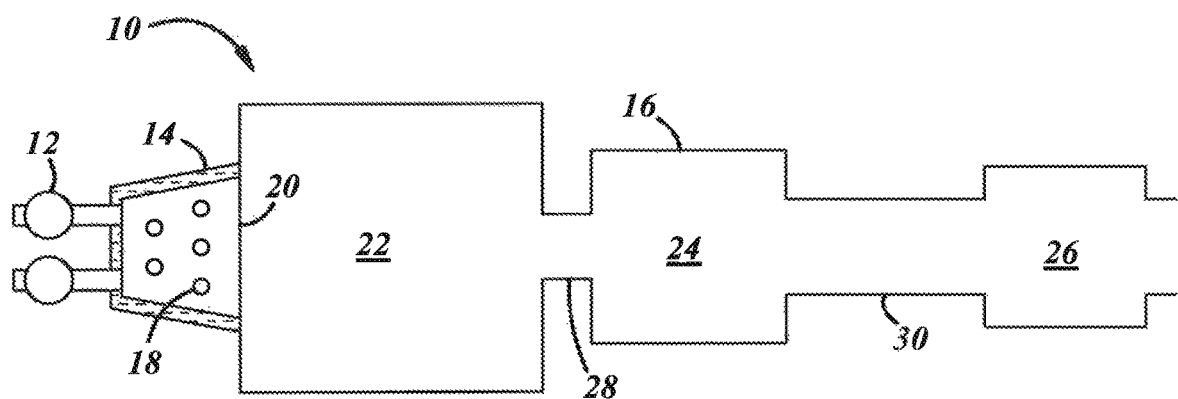
FIG. 1 is a top view of an apparatus for manufacturing glass, in accordance with an illustrative embodiment of the present disclosure, including an elongated tank and a doghouse located upstream of the tank in which glass-forming materials are melted by application of heat from floor-mounted submerged combustion burners.

The presently disclosed apparatus and process for manufacturing glass uses submerged combustion burners to rapidly melt a mixture of solid glass-forming materials known as a "glass batch" in a doghouse upstream of an elongated tank of a conventional glass furnace. The elongated tank includes a melting chamber, a refining chamber, and a conditioning chamber known as a forehearth. The glass batch may include a combination of solid raw materials, e.g. silica ($SiO_2$), soda ash ($Na_2CO_3$), and limestone ($CaCO_3$), as well as one or more pre-processed or recycled materials, e.g., cullet. In some cases, the glass batch may consist essentially of solid raw materials, without addition of any pre-processed or recycled materials. The glass batch also includes one or more refining agents, i.e., materials that release refining gases when heated above a certain temperature known as a refining-onset temperature. In some embodiments, the glass batch may include other minor ingredients, such as colorants and redox agents in amounts less than 5 wt. % of the glass batch.

The glass batch is melted in the doghouse by application of heat from the submerged combustion burners to produce molten glass. In the doghouse, the glass batch is heated to a temperature at or above the refining-onset temperature(s) of the one or more refining agents in the glass batch so that a major amount of the refining gas is released into the molten glass in the doghouse. The resulting molten glass is relatively foamy and contains a relatively high number of gas bubbles, as compared to molten glass that has been produced in a conventional commercial glass manufacturing furnace by application of heat from one or more overhead burners. The relatively high gas bubble content of the foamy molten glass may result from the additional gas bubbles introduced into the molten glass along with the by-products of combustion of the fuel and oxidant mixture supplied to the submerged combustion burners and/or the turbulent action caused within the molten glass by the submerged combustion burners. For example, the foamy molten glass produced in the doghouse by application of heat from the submerged combustion burners may comprise about 30 vol. % gas bubbles. On the other hand, molten glass produced in a conventional commercial glass manufacturing furnace by application of heat from overhead burners generally comprises, by volume, about 5% to about 20% gas bubbles.

However, unlike other glass melting operations, carbon dioxide ($CO_2$) is not the primary constituent of the gas bubbles initially present in the resulting foamy molten glass. Because the glass batch is initially heated by the submerged combustion burners at or above the fining-onset temperature of the one or more refining agents in the glass batch, the gas bubbles in the resulting foamy molten glass comprise significant amounts of sulfur dioxide ($SO_2$) and oxygen ($O_2$) in addition to $CO_2$. This means that the partial pressure of $CO_2$ in the gas bubbles is relatively low, which increases the amount of $CO_2$ released from the molten glass during the initial melting step and also decreases the amount of dissolved gases in the resulting molten glass. As a result, the efficiency of the subsequent refining process is increased due to the increase in the volume of gas bubbles in the molten glass that can be reabsorbed by the molten glass.

In addition, because the molten glass is heated to a relatively high temperature, i.e., to a temperature at or above the fining-onset temperature, at a relatively early stage of the manufacturing process, i.e., prior to entering the tank of the furnace, the resulting molten glass can be effectively refined in the tank in a relatively short amount of time and at a relatively low temperature, as compared to the times and temperatures typically required to refine molten glass produced at a lower temperature in a conventional continuously operated glass furnace. Further, contrary to conventional wisdom, the benefits of submerged combustion can now be realized in combination with continuous commercial glass manufacturing operations while also decreasing the total amount of time required to melt the solid glass-forming materials and to refine the resulting foamy molten glass.

FIG. 1 illustrates an apparatus 10 for manufacturing glass, in accordance with an embodiment of the present disclosure. The apparatus 10 includes a glass batch charger 12, a doghouse 14, and an elongated tank 16. Glass batch materials are charged or introduced into an upstream end of the doghouse 14 via the glass batch charger 12 and melted in the doghouse 14 by application of heat from one or more submerged combustion burners 18.

The glass batch materials introduced into the doghouse 14 may comprise, by weight, less than 20% of at least one fining agent, including all ranges and subranges therebetween. Some examples of suitable fining agents include sulfates, e.g., sodium sulfate ($Na_2SO_4$), which decomposes at temperatures in the range of 1100° C. to 1500° C.

releasing gases of sulfur dioxide ($SO_2$) and/or oxygen ($O_2$). When the at least one fining agent in the glass batch comprises sodium sulfate ($Na_2SO_4$), the sodium sulfate may be present in the glass batch in an amount ranging between 5-15 wt. % of the glass batch. The resulting molten glass is relatively foamy and may comprise between 25 vol. % and 35 vol. % gas bubbles, including all ranges and subranges therebetween. The gas bubbles in the molten glass may comprise 5-20 vol. % sulfur dioxide ($SO_2$) and 5-20 vol. % carbon dioxide ($CO_2$), including all ranges and subranges between these ranges.

The molten glass produced in the doghouse 14 is directed from the doghouse 14 into an upstream end of the tank 16. A weir or dam 20 may be positioned at a downstream end of the doghouse 14 to prevent un-melted glass-forming materials from entering the tank 16. Bubbles of a fining gas may be introduced into the molten glass flowing out of the doghouse 14 into the tank 16 by one or more submerged bubblers. In such case, the molten glass may have a temperature in the range of 1450 degrees Celsius to 1550 degrees Celsius as it exits the doghouse 14, including all ranges and subranges therebetween. The fining gas introduced into the molten glass may comprise sulfur dioxide ($SO_2$) and may be introduced into the molten glass in a sufficient amount to reduce the partial pressure of carbon dioxide ($CO_2$) in the gas bubbles.

The tank 16 includes a melting chamber 22, a refining chamber 24, and a conditioning chamber typically referred to as a forehearth 26. The melting chamber 22 and the refining chamber 24 may be separated by a throat 28, and the refining chamber 24 and the forehearth 26 may be separated by a waist 30.

The total duration, from charging of the glass batch in the doghouse 14 to discharging of the molten glass from the forehearth 26 may be less than 9 hours.

Molten glass produced within the doghouse 14 is received in the melting chamber 22 and flows from an upstream end to a downstream end thereof, toward the throat 28. Heat may be applied to the molten glass in the melting chamber 22, for example, by one or more additional combustion burners 46 (FIG. 4) located above a free surface S (FIGS. 3 and 4) of the glass and directed slightly above or onto the free surface S. Any remaining un-melted components of the glass batch may be melted in the melting chamber 22, such as any remaining sand grains. Gas bubbles are released from the molten glass in the melting chamber 22 as part of a primary fining process, wherein gas bubbles having diameters of greater than about 0.5 mm ascend within the body of molten glass to a free surface thereof and escape. Gas bubbles having diameters of greater than 0.4 mm may be referred to as "blisters," gas bubbles having diameters in the range of 0.1-0.4 mm are oftentimes referred to as "seeds," and gas bubbles having diameters of less than 0.1 mm may be referred to as "micro-seeds."

The rate at which the gas bubbles are released from the molten glass may be increased by use of one or more additional refining techniques. Such techniques may include: creating a subatmospheric pressure environment above the free surface of the body of molten glass, use of a sonic horn to produce ultrasonic vibrations within the molten glass, bubbling an inert gas through the body of molten glass, and stirring the molten glass.

Secondary fining of the molten glass, also known as "refining" takes place in the refining chamber 24 and to some extent the waist 30. Refining of the molten glass occurs after all of the relatively larger gas bubbles have been released from the molten glass and is accomplished by allowing the molten glass to cool to a temperature at which the remaining small gas bubbles, i.e., seeds, are absorbed by or dissolved into the molten glass. After the molten glass has been refined, the molten glass preferably contains less than 20 seeds per ounce of molten glass and does not include any gas bubbles having diameters greater than 0.3 mm. In some embodiments, the refined molten glass may contain less than 10 seeds per ounce of molten glass.

The refined molten glass is directed from the refining chamber 24 to the forehearth 26, where it is thermally conditioned by being cooled to a suitable temperature for forming.

Thereafter, the refined and thermally conditioned molten glass may be directed to one or more glass forming operations and used to produce glass articles. The composition of the glass articles may include: 65-80 wt. % $SiO_2$, 12-15 wt. % $Na_2O$, and 9-12 wt. % CaO, including all ranges and subranges between these ranges. Only about 0.1-5.0%, by weight, of the at least one fining agent in the glass batch may be retained in the final glass composition. For example, the amount of sulfur trioxide ($SO_3$) retained in the glass may be in the range of 0.1 wt. % to 0.3 wt. %, including all ranges and subranges therebetween.

Figure 2:
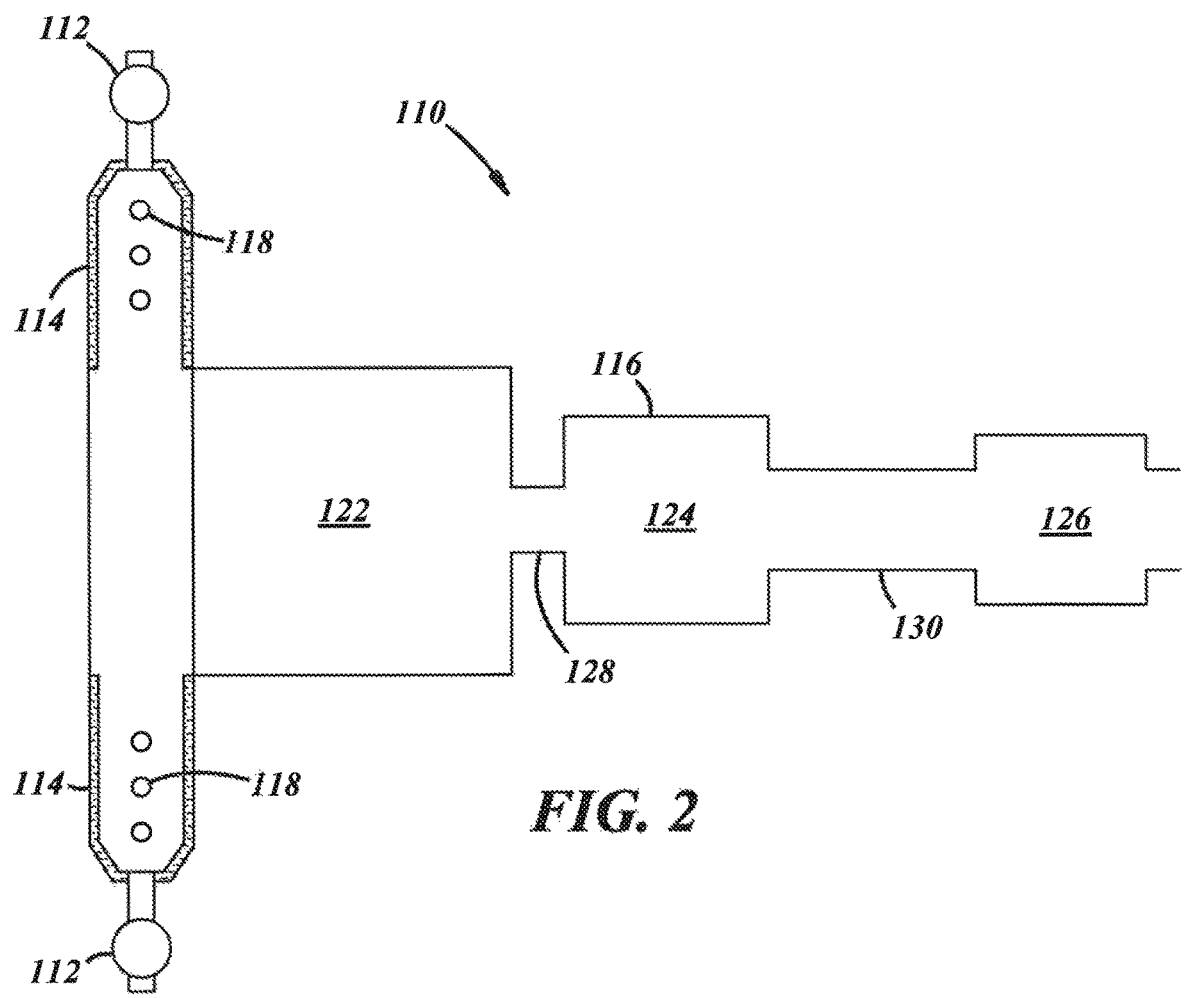
FIG. 2 is a top view of an apparatus for manufacturing glass, in accordance with another illustrative embodiment of the present disclosure, including an elongated tank and a pair of doghouses disposed on opposite sides of an upstream end of the tank.

FIG. 2 illustrates an apparatus 110 for manufacturing glass, in accordance with another embodiment of the present disclosure. This embodiment is similar in many respects to the embodiment illustrated in FIG. 1, and like numerals among the embodiments generally designate like or corresponding elements. Accordingly, the descriptions of the embodiments are incorporated into one another, and description of subject matter common to the embodiments generally may not be repeated here.

In the embodiment illustrated in FIG. 2, two offset doghouses 114 are positioned on opposite sides of an upstream end of an elongated melting tank 116. Solid glass batch materials are introduced into an upstream end of each of the doghouses 114 via separate glass batch chargers 112 and melted by application of heat from submerged combustion burners 118. The flow of molten glass within the offset doghouses 114 is transverse to the flow direction of the molten glass flowing from the upstream end to the downstream end of the melting tank 116. Offsetting the doghouses 114 from the main melting tank 116 in this way allows the reactive chemistry of the foamy molten glass to calm down to a certain extent prior to entering the melting tank 116, which may help mitigate erosion of the refractory materials in the melting tank 116. The molten glass produced in the doghouse 114 is directed into a melting chamber 122 located at the upstream end of the melting tank 116. Thereafter, the molten glass is directed from the melting chamber 122, through a throat 128, into a refining chamber 124, a waist 130, and then a forehearth 126.

Figure 3:
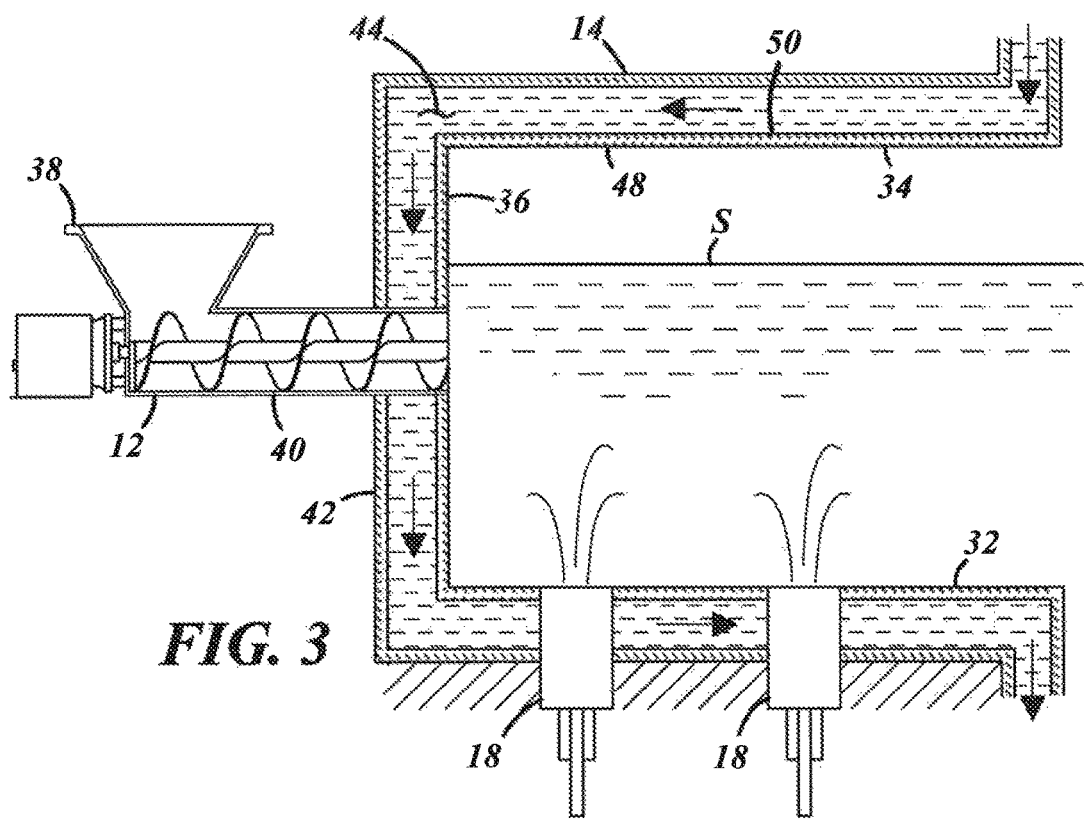
FIG. 3 is a side sectional view of the doghouse of FIG. 1.

FIG. 3 illustrates a side sectional view of the doghouse 14 of FIG. 1. As shown, the doghouse 14 includes a floor 32, a roof 34, and a sidewall 36 connecting the floor 32 and the roof 34. The doghouse 14 receives glass batch materials from the glass batch charger 12, which may include a hopper 38 and a conveyor 40. The conveyor 40 may have an outlet above or below a free surface S of the molten glass already in the doghouse 14. The conveyor 40 may be a reciprocating pusher-type charger, a screw conveyor, or any other device suitable for charging glass batch materials into the doghouse 14 above or below the free surface S of the molten glass already in the doghouse 14.

The submerged combustion burners 18 are mounted in the floor 32 of the doghouse 14 and may be positioned such that the glass batch entering the doghouse 14 is immediately exposed to the high-intensity flame(s) and combustion products generated by the one or more submerged burners 18. This arrangement allows for relatively rapid dissolution of the solid glass batch materials in the molten glass, as compared to conventional commercial glass melting furnace, which typically rely solely on burners 46 positioned above the free surface S of the molten glass in the doghouse 14 and the melting tank 22 to melt the blanket of glass batch materials overlying the free surface S of the molten glass.

The floor 32, roof 34, and sidewall 36 of the doghouse 14 may be cooled such that a solid, frozen layer of glass forms on an interior surface 48 thereof during the glass manufacturing process. This solid layer of glass may help protect the floor 32, roof 34, and sidewall 36 from corrosion and wear or erosion, which may result from the formation of convection currents or turbulence within the molten glass in the doghouse 14. In the embodiment illustrated in FIG. 3, the floor 32, roof 34, and sidewall 36 are cooled using water jackets or panels 42 having a cooling water channel 44 formed therein through which cooling water or another liquid coolant can flow. In this arrangement, liquid coolant can flow through the cooling water channel 44 such that the liquid coolant contacts an exterior surface 50 of the doghouse 14 and transfers heat away from the interior surface 48 of the doghouse 14. Transferring heat away from the interior surface 48 of the doghouse 14 will effectively cool a layer of molten glass disposed along the interior surface 48 of the doghouse 14 and allow for the formation of a solid, frozen layer of glass on the interior surface 48 of the doghouse 14.

Figure 4:
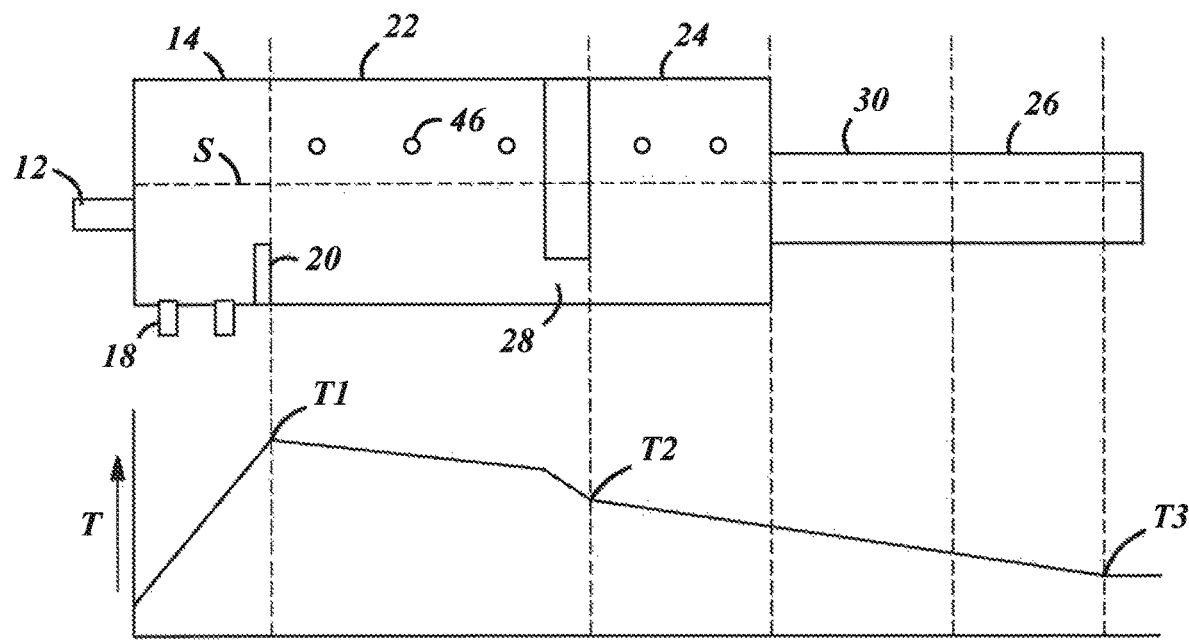
FIG. 4 is a side view of the apparatus of FIG. 1 and a temperature profile of the apparatus.

FIG. 4 illustrates a side view of the apparatus 10 of FIG. 1 and a temperature profile of the molten glass flowing through the apparatus 10. The glass batch materials are introduced into the doghouse 14 via the glass batch charger 12 and melted in the doghouse 14 by application of heat from the submerged combustion burners 18. The molten glass produced in the doghouse 14 is directed into the melting chamber 22 located at the upstream end of the tank 16. Thereafter, the molten glass is directed from the melting chamber 22, through the throat 28, into the refining chamber 24, the waist 30, and then the forehearth 26.

Unlike conventional commercial glass manufacturing operations, the molten glass within the doghouse 14 reaches a higher temperature than any region within the tank 16, and preferably is heated within the doghouse 14 to a temperature at or above the fining-onset temperature of the fining agent(s) within the glass batch. For example, the solid glass batch materials and the molten glass may be melted together in the doghouse 14 at a temperature, T1, in the range of 1350 degrees Celsius to 1550 degrees Celsius, including all ranges and subranges therebetween. In some embodiments, the solid glass batch materials and the molten glass may be melted together in the doghouse 14 at a temperature, T1, in the range of 1450 degrees Celsius to 1550 degrees Celsius, including all ranges and subranges therebetween. The temperatures reached in the doghouse 14 of the presently disclosed apparatus 10 are substantially higher than the temperatures reached in the doghouse of a conventional continuously operated glass furnace, which are typically less than 1200 degrees Celsius.

According to embodiments of the present disclosure, the temperature of the molten glass in the tank 16 may be at least 100 degrees Celsius lower than the melting temperatures achieved within the doghouse 14. For example, the molten glass flowing through the tank 16 may be maintained at a temperature less than or equal to 1400 degrees Celsius.

The molten glass may gradually cool as it flows through the melting chamber 22. By the time the molten glass reaches the refining chamber 24, the molten glass may have cooled down to a temperature, T2, in the range of 1200 degrees Celsius to 1300 degrees Celsius, including all ranges and subranges therebetween. The molten glass may continue to cool as it flows through the refining chamber 24, the waist 30, and the forehearth 26 until the molten glass reaches a suitable temperature for forming, T3, in the range of 1000 degrees Celsius to 1100 degrees Celsius, including all ranges and subranges therebetween.

Using submerged combustion burners 18 within the doghouse 14 allows the glass batch to be rapidly melted and also allows the resulting molten glass to be heated above the fining-onset temperature of the fining agent(s) in a relatively short period of time, and preferably before the resulting molten glass enters the melting chamber 22. When a glass batch is melted in a conventional continuously operated glass furnace, the resulting molten glass does not reach a maximum temperature until it reaches a relatively hot zone known as a "spring zone" within the tank 16, which is generally located within the melting chamber 22. The temperature of the spring zone within a melting tank of a conventional continuously operated glass furnace may be in the range of 1600 degrees Celsius to 1650 degrees Celsius.

There thus has been disclosed a glass manufacturing process, that fully satisfies one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:

1. A process for manufacturing glass including:
   (a) providing a mixture of solid glass-forming materials comprising at least one fining agent having a fining-onset temperature;
   (b) introducing the mixture of solid glass-forming materials into offset doghouses located upstream of an elongated tank, the elongated tank including a melting chamber and a refining chamber separated by a submerged throat, and wherein molten glass flows through the elongated tank in a flow direction;
   (c) melting the mixture of solid glass-forming materials in each of the offset doghouses at a temperature at or above the fining-onset temperature of the at least one fining agent by application of heat from one or more submerged combustion burners;
   (d) producing molten glass in each of the offset doghouses that comprises greater than 25 vol. % gas bubbles;
   (e) flowing the molten glass produced in each of the offset doghouses in a direction transverse to the flow direction of the molten glass flowing through the elongated tank prior to the molten glass from each of the offset doghouses entering the melting chamber;
   (f) directing the molten glass from each of the offset doghouses into the melting chamber of the elongated tank;
   (g) flowing the molten glass from the melting chamber of the elongated tank into the refining chamber of the elongated tank through the submerged throat; and (h) refining the molten glass in the refining chamber of the elongated tank to produce refined molten glass having on average less than 20 seeds per ounce.

2. The process set forth in claim 1 wherein the at least one fining agent constitutes, by weight, less than 20% of the mixture of solid glass-forming materials.

3. The process set forth in claim 1 wherein the gas bubbles produced in step (d) comprise, by volume, 5% to 20% sulfur dioxide ($SO_2$) and 5% to 20% carbon dioxide ($CO_2$).

4. The process set forth in claim 1 wherein step (b) includes introducing the mixture of solid glass-forming materials into each of the offset doghouses below a free surface of the molten glass in the offset doghouses.

5. The process set forth in claim 1 wherein step (c) includes melting the mixture of solid glass-forming materials in each of the offset doghouses at a temperature greater than or equal to 1350° C.

6. The process set forth in claim 1 wherein the molten glass directed into the melting chamber of the elongated tank is at a temperature ranging from 1450° C. to 1550° C.

7. The process set forth in claim 1 including:
introducing a fining gas into the molten glass exiting each of the offset doghouses.

8. The process set forth in claim 7 wherein the fining gas introduced into the molten glass comprises sulfur dioxide ($SO_2$), and wherein a partial pressure of carbon dioxide ($CO_2$) in the gas bubbles in the molten glass at an upstream end of the elongated tank is less than a partial pressure of carbon dioxide in the gas bubbles in the molten glass in the offset doghouses.

9. The process set forth in claim 1 wherein the molten glass is maintained at a temperature less than or equal to 1400° C. in the elongated tank.

10. The process set forth in claim 1 wherein the molten glass is gradually and continuously cooled within the melting chamber and the refining chamber as the molten glass flows through the elongated tank.

11. A process for manufacturing glass including:
(a) charging a mixture of solid glass-forming materials comprising less than 20 wt. % of at least one fining agent into a doghouse of a furnace located upstream of an elongated tank;
(b) melting the mixture of solid glass-forming materials in the doghouse at a melting temperature ranging from 1450° C. to 1550° C. by application of heat from one or more submerged combustion burners for less than 3 hours to produce molten glass;
(c) directing the molten glass from the doghouse into an upstream end of the elongated tank;
(d) further melting and refining the molten glass in the elongated tank at temperatures at least 100 degrees Celsius lower than the melting temperature in the doghouse for less than 6 hours; and then
(e) discharging the molten glass from a downstream end of the elongated tank, wherein the molten glass in the elongated tank is maintained at a temperature less than or equal to 1400° C. and is gradually and continuously cooled to a temperature in the range of 1000° C. to 1100° C. at the downstream end of the elongated tank, and wherein the duration from charging to discharging is less than 9 hours.

12. The process set forth in claim 11 wherein step (a) includes charging the mixture of solid glass-forming materials into the doghouse below a free surface of the molten glass in the doghouse.

13. The process set forth in claim 11 wherein the elongated tank includes a melting chamber and a refining chamber separated by a submerged throat, and wherein the melting chamber provides the upstream end of the elongated tank.

14. The process set forth in claim 13 wherein the elongated tank further comprises a forehearth downstream from the refining chamber, and wherein the forehearth provides the downstream end of the elongated tank.

15. The process set forth in claim 11 wherein step (a) comprises charging the mixture of solid glass-forming materials into offset doghouses, and wherein step (c) comprises flowing the molten glass produced in each of the offset doghouses in a direction transverse to a flow direction of the molten glass flowing through the elongated tank prior to the molten glass from each of the offset doghouses entering the elongated tank.

16. A process for manufacturing glass, the process comprising:
(a) providing a mixture of solid glass-forming materials comprising at least one fining agent having a fining-onset temperature, the at least one fining agent comprising sodium sulfate ($Na_2SO_4$), and wherein the at least one fining agent is present in the mixture of solid glass-forming materials in an amount constituting 5-15 wt. % of the mixture;
(b) introducing the mixture of solid glass-forming materials into a doghouse located upstream of an elongated tank;
(c) melting the mixture of solid glass-forming materials in the doghouse at a temperature at or above the fining-onset temperature of the at least one fining agent by application of heat from one or more submerged combustion burners;
(d) producing molten glass that comprises greater than 25 vol. % gas bubbles;
(e) directing the molten glass from the doghouse into an upstream end of the elongated tank; and
(f) refining the molten glass in the elongated tank to produce refined molten glass having on average less than 20 seeds per ounce.

17. The process set forth in claim 16 wherein the refined molten glass produced in step (f) comprises a retained amount of sulfur trioxide ($SO_3$) in the range of 0.1 wt. % to 0.3 wt. % of the refined molten glass.

18. The process set forth in claim 16 wherein the elongated tank includes a melting chamber and a refining chamber separated by a submerged throat, the melting chamber providing the upstream end of the elongated tank, and wherein the molten glass is gradually and continuously cooled within the melting chamber and the refining chamber of the elongated tank as the molten glass flows through the elongated tank.

19. The process set forth in claim 16 wherein step (b) comprises introducing the mixture of solid glass-forming materials into offset doghouses, and wherein step (e) comprises flowing the molten glass produced in each of the offset doghouses in a direction transverse to a flow direction of the molten glass flowing through the elongated tank prior to the molten glass from each of the offset doghouses entering the elongated tank.

* * * * *